United States Patent Office 2,819,972
Patented Jan. 14, 1958

2,819,972

METHOD OF PRESERVING FRUITS AND VEGETABLES

Albert A. Robbins, West Covina, Calif., assignor of one tenth to Philip Subkow, Los Angeles, Calif.

No Drawing. Application April 3, 1952
Serial No. 280,373

24 Claims. (Cl. 99—154)

This application is a continuation-in-part of application Serial No. 195,149, filed November 10, 1950, and relates to the preservation of the quality of fresh fruits, flowers, and vegetables, all inclusively, hereinafter referred to as agricultural products, by the treatment thereof with solutions of cinnamate ion, both in its acid and salt forms, dissolved in water.

I have found that the storage life of such treated agricultural products, and particularly white Irish potatoes, sweet potatoes, and onions, is increased materially by my treatment. The process consists in wetting the agricultural product with a water solution of the cinnamic acid, or cinnamic acid salt in the presence of dissolved alpha or beta naphthol. The cinnamate ion, particularly in the presence of alpha or beta naphthol, appears to have a preservative action on the agricultural product, in that the properties of the freshly picked agricultural product are preserved for a longer period if so treated than those of untreated agricultural products.

I may employ either the cinnamic acids or salts of cinnamic acid, employing preferably the salts whose metal ions are physiologically harmless, such as the sodium salt which is more soluble than the acid form. This acid has a low solubility in water, yet I have found that a solution of commercial transcinnamic acid in water at atmospheric temperature is highly efficient for my purpose. I may also employ water solutions of the cis form of the cinnamate ion in the form of acid or salts in the presence of saturated sol of beta naphthol or alpha paphtol.

The process is applicable to fruits and vegetables, for example, apples, pears, grapefruit, lemons, oranges, apricots, avocados, legumes, such as string beans, Lima beans, kidney beans, berries, such as strawberries, raspberries, blackberries, loganberries, youngberries, etc., as well as to cucumbers, cherries, cranberries, dates, eggplant, figs, guavas, melons, such as muskmelons, cantaloupes, Persian melons, honeydew, etc., nectarines, plums, prunes, peaches, pumpkins, peppers, both green and red; pomegranates, persimmons, bananas, and radishes.

In the case of the legumes, such as peas, Lima beans and kidney beans, with pods, I may shell them and wet the beans or peas, or I may cut the stem from the pod and treat the pod, particularly the cut end thereof.

In the case of vegetables having a corky stem or one having greater permeability to fluid, I may leave a greater amount of stem; for example, the banana, where the stem is pithy or corky and a good conductor for fluid, I may permit a greater amount of stem to remain. However, in this case, also, it is desirable to cut the vegetable from the stem at the butt, that is close to the leafy part. Thus, in the case of lettuce, corn, artichokes, cauliflower, celery, chard, kale, kohlrabi, pineapple, squash, etc., the vegetable is cut close to the butt thereof to remove the stem or root.

In the case of asparagus and broccoli, where the stem is the edible portion of the vegetable, the stem may be treated by cutting it as is usual in present commercial operations and then treat the vegetable and particularly the cut portion of the stem.

In the case of the root type vegetables, such as potatoes and yams, I treat the potato and yam as a unit, and in the case of carrots, turnips, radishes and beets, I may also remove the greens so as to leave the naked root or treat the root and leaves.

In the case of the leafy vegetables, such as mint, mustard greens, parsley, spinach, and watercress, I coat the entire leaf, including the cut stem, as will be described below. Where, as in the case of grapes, the fruit is sold in bunches, I treat them in such bunches.

As indicated, instead of using cinnamic acid I may employ a solution of a salt of cinnamic acid using a concentration as low as one part per million and up to five parts of cinnamate ion per 100 parts of water or higher concentration. I prefer to employ the physiologically harmless salts of these acids which have a solubility as high or higher than the acid, since if they be lower I may use the acid itself. I may use the cinnamate salt of the Na, K, NH₄ or of the alkaline earth metal, such as Ca or Mg and heavy metal Cu, Ag, or other oligodynamic metal ions.

For commercial operations I propose to introduce the cinnamic acid and the naphthol into the wash water. The wash water may be passed through a bed of the cinnamic acid and alpha or beta naphthol contained in any suitable container or I may introduce the cinnamic acid into the container in which the potatoes are washed in any suitable manner. The transcinnamic acid has a solubility of about .1 part per 100 parts of distilled water at 25° C. and .04 part at 18° C. Beta naphthol is soluble in cold water at the rate of .1 part in 100 parts of water. The solubility of the cinnamic acid in ordinary water will depend somewhat on the pH of the water; in soft waters alkaline with Na, a higher concentration of the cinnamate ions may be obtained due to the higher solubility of the developed cinnamate salt. In acid waters a lower solubility results. In neutral or alkaline water, the cinnamic acid will lower the pH of the water and place it on the acid side. The use of acid waters in such circumstances has, as I have found, a beneficial effect in prolonging the storage life of vegetables, and particularly potatoes, both Irish and sweet, and onions. They may be stored for prolonged periods without refrigeration.

I may employ waters having a relatively low temperature, down as low as 0° C. and the saturated solution of the cinnamic acid at such temperature appears sufficient to produce the above results. I may also employ waters as high as boiling water for this purpose and obtain a higher concentration of cinnamic acid. The time of contact of the solution of the acid with the fruit or vegetable for treatment may be adjusted, using a longer time for the lower concentrations. I have found that no alteration in the washing techniques commercially employed is required, irrespective of the temperature of the water.

I have washed new white potatoes as they come from the field with solutions of commercial transcinnamic acid, and saturated with naphthol in which the acid is used in concentrations as low as one part per million of water and up to saturated solutions at atmospheric temperature and have compared their storage and preservative qualities with potatoes washed with water alone. The new potatoes treated with the cinnamic acid and naphthol solution have a brighter skin compared with the darker skin of new potatoes washed with water alone. I have kept the potatoes washed with the cinnamic acid and naphthol solution for a period of many weeks at ordinary summer temperature without refrigeration and the potatoes have remained fresh, firm, and without blemish. I have not yet determined the full length of the storage period. Sprouting takes longer than with untreated potatoes. Such potatoes as are injured in handling and washing appear to heal, in that the scars callous over without developing rot or decaying spots. This is also true of injured potatoes which have started to rot at the wound. Potatoes washed with water under parallel conditions go bad in a very few days of storage.

The cinnamate ion and naphthol treatment also reduces the loss of weight of potatoes and yams which always results from storage of potatoes. This loss of weight apparently results from dehydration of the potatoes. It has been observed that if this loss of weight becomes large, discoloration and even rotting of the potatoes occurs. While I do not know whether these phenomena are related as to cause and effect or result from the same or different but simultaneous processes occurring in the potato during storage, and I do not desire to be bound by any theory of this action. I have observed as a fact that potatoes, and particularly new white potatoes (sometimes referred to as Irish potatoes) when treated by my process lose considerably less weight in storage and remain unspoiled and fresh appearing for longer periods than do such potatoes untreated. Sprouting also is delayed. In the case of sweet potatoes and yams, the yellow color becomes intensified. Melons treated by this procedure may be held without further ripening for from ten to fifteen days under normal commercial refrigeration.

Onions were washed with the cinnamic acid and naphthol solution and remained fresh, with no darkening or spoilage after two months' storage at ordinary room temperature, while a check of untreated onions were bad and darkened in two weeks.

I have found it advantageous to contain the crystals of transcinnamic acid and naphthol in a porous fabric bag and enclose the bag in a container formed of a copper mesh and insert the bag into a closed iron or steel chamber through which I may circulate water, which thus passes into the chamber through the copper mesh and the fabric bag, dissolving the crystals. I am also of the opinion that some copper cinnamate and iron cinnamate are formed by corrosion and that these salts, and particularly the copper ion, are also helpful. The solution then made may be passed, with or without further dilution into and through vats in which the agricultural products may be placed or dipped.

While I may thus add oligodynamic ions to the cinnamate solutions, I find that the activity of the cinnamate ion and the naphthol is sufficient and the examples given above were made by dissolving the cinnamic acid as such in water.

While I have described a particular embodiment of my invention for the purpose of illustration, it should be understood that various modifications thereof may be made within the spirit of the invention as set forth in the appended claims.

I claim:

1. A process for treating agricultural products chosen from the group consisting of fruits and vegetables, comprising wetting the agricultural products with a water solution of cinnamate ions and naphthol.

2. A process for treating agricultural products chosen from the group consisting of fruits and vegetables, comprising wetting the agricultural products with a water solution of trans-cinnamate ions and naphthol.

3. A process for treating agricultural products chosen from the group consisting of fruits and vegetables, which comprises wetting the agricultural products with a water solution of cinnamic acid and naphthol.

4. A process for treating agricultural products chosen from the group consisting of fruits and vegetables, which comprises wetting the agricultural products with a water solution of trans-cinnamic acid and naphthol.

5. A process for treating agricultural products chosen from the group consisting of fruits and vegetables, comprising wetting the agricultural products with a water solution of cinnamate ions in concentration ranging from one part per million up to saturated solution and naphthol.

6. A process for treating agricultural products chosen from the group consisting of fruits and vegetables, comprising wetting the agricultural products with a water solution of trans-cinnamate ions in concentration ranging from one part per million up to saturated solution and naphthol.

7. A process for treating agricultural products chosen from the group consisting of fruits and vegetables, which comprises wetting the agricultural products with a water solution of cinnamic acid in concentration ranging from one part per million up to saturated solution and naphthol.

8. A process for treating agricultural products chosen from the group consisting of fruits and vegetables, which comprises wetting the agricultural products with a water solution of trans-cinnamic acid in concentration ranging from one part per million up to saturated solution and naphthol.

9. A process for treating agricultural products chosen from the group consisting of fruits and vegetables, comprising wetting the agricultural products with a water solution of cinnamate ions in concentration ranging from one part per million up to saturated solution, oligodynamic metal ions and naphthol.

10. A process for treating agricultural products chosen from the group consisting of fruits and vegetables, comprising wetting the agricultural products with a water solution of trans-cinnamate ions in concentration ranging from one part per million up to saturated solution, oligodynamic metal ions and naphthol.

11. A process for treating agricultural products chosen from the group consisting of fruits and vegetables, which comprises wetting the agricultural products with a water solution of cinnamic acid in concentration ranging from one part per million up to saturated solution, oligodynamic metal ions and naphthol.

12. A process for treating agricultural products chosen from the group consisting of fruits and vegetables, which comprises wetting the agricultural products with a water solution of trans-cinnamate ions in concentration ranging from one part per million up to saturated solution, oligodynamic metal ions and naphthol.

13. A process for treating Irish potatoes, comprising wetting the Irish potatoes with a water solution of cinnamate ions and naphthol.

14. A process for treating Irish potatoes, comprising wetting the Irish potatoes with a water solution of trans-cinnamate ions and naphthol.

15. A process for treating Irish potatoes which comprises wetting the Irish potatoes with a water solution of cinnamic acid and naphthol.

16. A process for treating Irish potatoes, which comprises wetting the Irish potatoes with a water solution of trans-cinnamic acid and naphthol.

17. A process for treating yams, comprising wetting the yams with a water solution of cinnamate ions and naphthol.

18. A process for treating yams, comprising wetting the yams with a water solution of trans-cinnamate ions and naphthol.

19. A process for treating yams, which comprises wetting the yams with a water solution of cinnamic acid and naphthol.

20. A process for treating yams, which comprises wetting the yams with a water solution of trans-cinnamic acid and naphthol.

21. A process for treating onions, comprising wetting the onions with a water solution of cinnamate ions and naphthol.

22. A process for treating onions, comprising wetting the onions with a water solution of trans-cinnamate ions and naphthol.

23. A process for treating onions, which comprises wetting the onions with a water solution of cinnamic acid and naphthol.

24. A process for treating onions, which comprises wetting the onions with a water solution of transcinnamic acid and naphthol.

References Cited in the file of this patent

UNITED STATES PATENTS

| | | |
|---|---|---|
| 1,627,342 | Sabalitschka | May 3, 1927 |
| 1,961,740 | Conquest | June 5, 1934 |

OTHER REFERENCES

"Nature," January 29, 1944, page 141, article entitled "Aerial Disinfection."